United States Patent
Hall

(10) Patent No.: US 7,087,918 B2
(45) Date of Patent: Aug. 8, 2006

(54) APPARATUS AND METHOD FOR STORAGE PHOSHOR ERASE

(75) Inventor: John H. Hall, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 297 days.

(21) Appl. No.: 10/814,355

(22) Filed: Mar. 31, 2004

(65) Prior Publication Data

US 2005/0199836 A1    Sep. 15, 2005

Related U.S. Application Data

(60) Provisional application No. 60/553,102, filed on Mar. 15, 2004.

(51) Int. Cl.
*G01N 23/04* (2006.01)

(52) U.S. Cl. .................................... 250/588
(58) Field of Classification Search ................ 250/288
See application file for complete search history.

(56) References Cited

U.S. PATENT DOCUMENTS

| | | |
|---|---|---|
| RE31,847 E | 3/1985 | Luckey |
| 4,947,043 A | 8/1990 | Shimura |
| 5,237,177 A | 8/1993 | Kimura |
| 5,534,709 A | 7/1996 | Yoshimoto et al. |
| 5,534,710 A | 7/1996 | Suzuki |
| 5,550,386 A | 8/1996 | Kojima et al. |
| 5,943,390 A | 8/1999 | Wendlandt et al. |
| 6,140,663 A | 10/2000 | Neary et al. |
| 6,388,266 B1 | 5/2002 | Muller |
| 2004/0238767 A1 | 12/2004 | Steklenski et al. |

*Primary Examiner*—David Porta
*Assistant Examiner*—Djura Malevic
(74) *Attorney, Agent, or Firm*—Susan L. Paralski

(57) ABSTRACT

An apparatus and method for removing stored energy from a storage phosphor screen in which a radiation image was recorded and then read by collecting stimulated emission from the phosphor sheet. The phosphor sheet is transported along a path in a first direction at a first speed into an erase area having at least one erasing light source. A portion of the phosphor sheet disposed within the erase area is exposed to the light source to affect erasure of the radiation image on the exposed portion of the phosphor sheet. Transport of the phosphor sheet is stopped when the trailing edge of the phosphor sheet enters the erase area and the phosphor sheet dwells within the erase area for a predetermined time period. The phosphor sheet is then transported along the path in a second direction at a second speed, and then transported along the path in the second direction at a third speed when the leading edge exits the erase area.

12 Claims, 5 Drawing Sheets

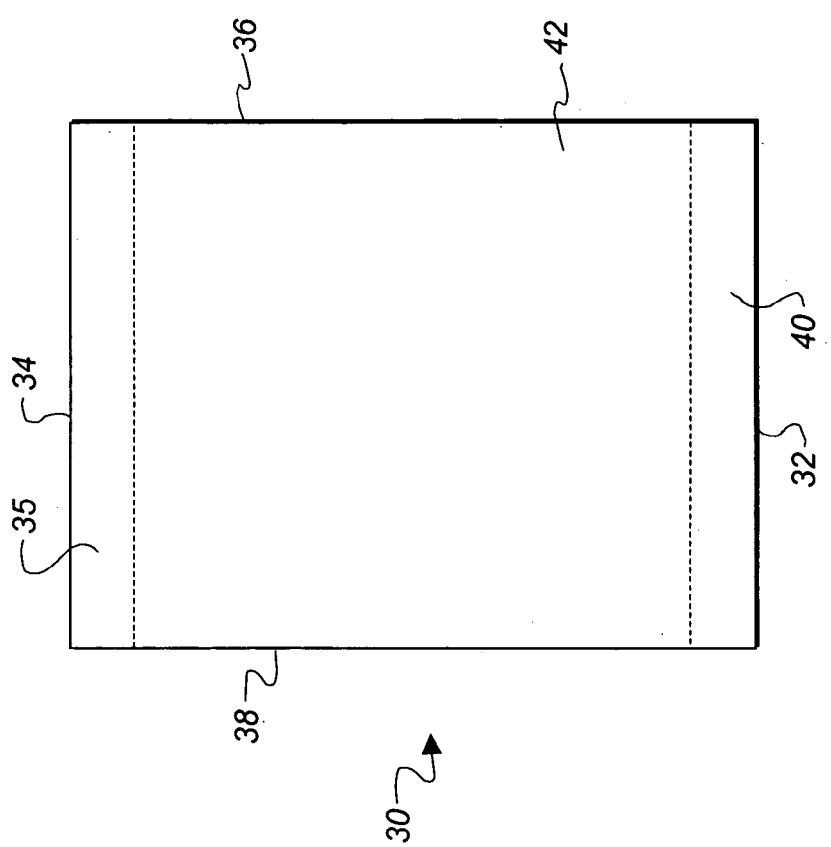

APPARATUS AND METHOD FOR STORAGE PHOSHOR ERASE

CROSS REFERENCE TO RELATED APPLICATION

Reference is made to and priority claimed from U.S. Provisional Application Ser. No. 60/553,102, filed Mar. 15, 2004, entitled APPARATUS AND METHOD FOR STORAGE PHOSPHOR ERASE.

FIELD OF THE INVENTION

The invention is directed to a storage phosphor imaging system, and more particularly, to the erasure of storage phosphor.

BACKGROUND OF THE INVENTION

Storage phosphor imaging systems are known. In one such system, a storage phosphor is exposed to an x-ray image of an object, such as a body part of a patient, to record a latent x-ray image in the storage phosphor. The latent x-ray image is read out by stimulating the storage phosphor with stimulating radiation. Upon stimulation, the storage phosphor releases emitted radiation of a particular wavelength. To produce a signal useful in electronic image processing, the storage phosphor is scanned, for example, by a laser beam deflected by an oscillating or rotating scanning mirror or by a rotation hologon. The emitted radiation from the storage phosphor is reflected by a collector and detected by a photodetector, such as a photomultiplier, to produce an electronic x-ray image signal. The x-ray image signal can then be viewed as a visual image produced by a softcopy display device, such as a CRT or LCD display, or a hardcopy display device, such as a x-ray film printer (laser printer, CRT printer, thermal printer).

U.S. Pat. No. Re. 31,847 (Luckey) discloses a storage phosphor system. The reader is often referred to as a computed radiography (CR) reader.

The storage phosphor can be disposed on a medium, such as a sheet or a screen. After the storage phosphor is processed/scanned/read/exposed by the storage phosphor processor/reader, the storage phosphor can be fed to an erasing unit to erase the radiation image information from the storage phosphor, after which the storage phosphor is returned to the cassette for reuse.

Erasure of the storage phosphor is known, such as disclosed in U.S. Pat. No. 5,237,177 (Kimura); U.S. Pat. No. 5,534,709 (Yoshimoto); U.S. Pat. No. 5,550,386 (Kojima); U.S. Pat. No. 6,140,663 (Neary); and U.S. Pat. No. 5,534,710 (Suzuki).

The present invention provides an apparatus and method for erasing the storage phosphor which provides for uniform erasure of the storage phosphor.

SUMMARY OF THE INVENTION

According to one aspect of the present invention, there is provided a CR reader having means to erase the storage phosphor disposed on a medium.

According to another aspect of the present invention, there is provided a method for uniformly erasing the storage phosphor disposed on a medium.

This object is given only by way of illustrative example, and such object may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for erasing a radiation image in a storage phosphor sheet in which a radiation image was recorded and then read by collecting stimulated emission from the phosphor sheet. The method comprising the steps of: transporting the phosphor sheet along a path in a first direction at a first speed into an erase area having at least one erasing light source, the phosphor sheet having a leading edge and a trailing edge; exposing a portion of the phosphor sheet disposed within the erase area to the light source to affect erasure of the radiation image on the exposed portion of the phosphor sheet; stopping transport of the phosphor sheet when the trailing edge of the phosphor sheet enters the erase area; causing the phosphor sheet to dwell within the erase area for a predetermined time period; transporting the phosphor sheet along the path in a second direction opposite the first direction at a second speed different than the first speed; and transporting the phosphor sheet along the path in the second direction at a third speed different than the second speed when the leading edge exits the erase area.

According to another aspect of the invention, there is provided an apparatus for removing stored energy from a storage phosphor screen in which a radiation image was recorded and then read by collecting stimulated emission from the phosphor sheet, wherein the phosphor sheet has a leading edge and a trailing edge. The apparatus comprises: an erase area having at least one erasing light source; transport means for transporting the phosphor sheet along a path in a first direction at a first speed into the erase area to expose a portion of the phosphor sheet disposed within the erase area to the light source to affect erasure of the radiation image on the exposed portion of the phosphor sheet; control means for effecting (i) stopping of the transport of the phosphor sheet when the trailing edge of the phosphor sheet enters the erase area, (ii) dwelling of the phosphor sheet within the erase area for a predetermined time period and (iii) transport of the phosphor sheet along the path in a second direction opposite the first direction after dwelling; determining means for determining a second speed different than the first speed in which to transport the phosphor sheet along the path in the second direction; and determining means for determining a third speed different than the second speed in which to transport the phosphor sheet along the path in the second direction when the leading edge exits the erase area.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 5 shows an exemplary screen.

DETAILED DESCRIPTION OF THE INVENTION

Figure 1:
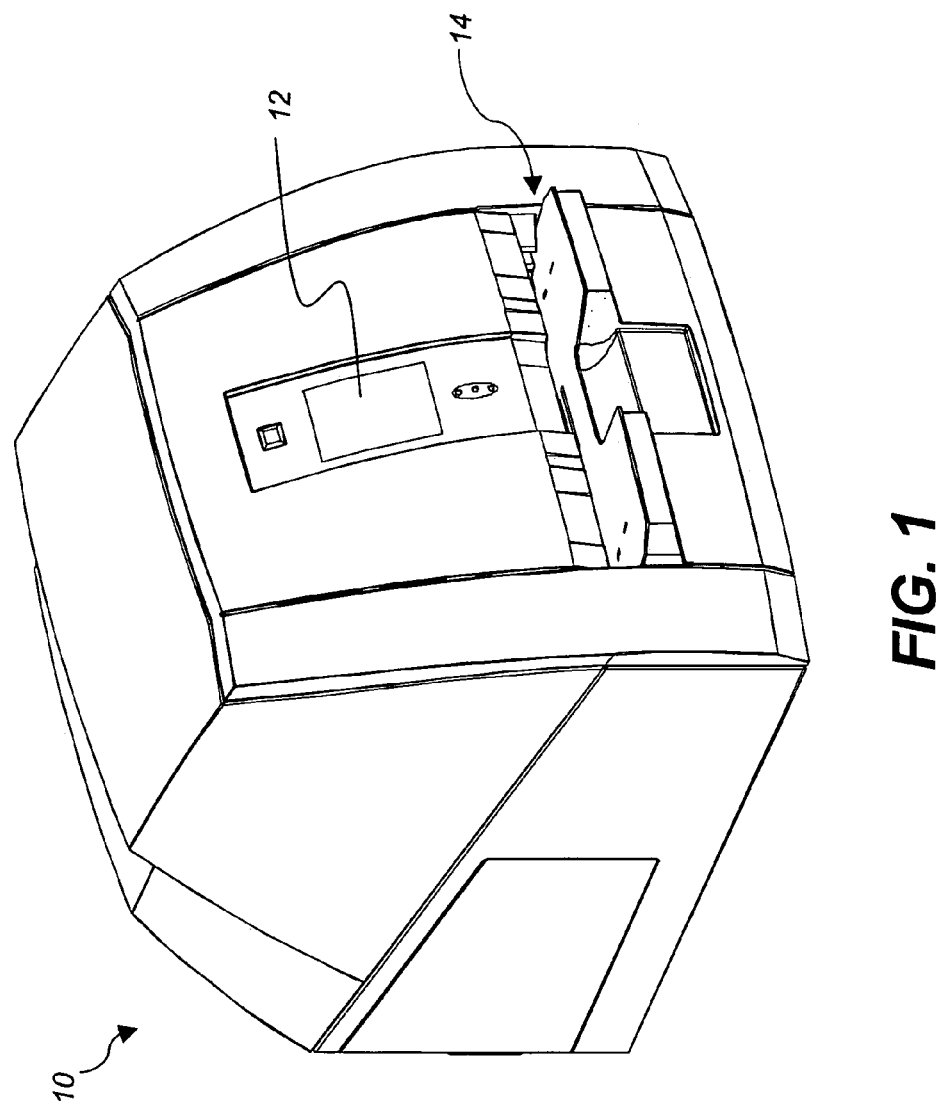
FIG. 1 shows a front perspective view of a storage phosphor reader in accordance with the present invention.

The following is a detailed description of the preferred embodiments of the invention, reference being made to the drawings in which the same reference numerals identify the same elements of structure in each of the several figures.

Referring to FIGS. 1 through 4 there is shown an exemplary storage phosphor reader 10 in accordance with the present invention. Storage phosphor reader 10 processes images captured on storage phosphor using conventional radiographic equipments. Reader 10 then scans the storage phosphor and converts the latent x-ray image therein into an electrical x-ray image signal which can be viewed. Reader 10 can optionally include a touch screen, generally illustrated in FIG. 1 as display 12, for initiating operations of reader 10 or displaying information.

The storage phosphor used to hold the latent image can be erased and used repeatably. The storage phosphor can be disposed on a flexible or semi-flexible medium, such as a sheet, which can be mounted in an x-ray cassette. An example of such a cassette is disclosed in U.S. Ser. No. 10/767,277 provisionally filed on Feb. 3, 2003 as Provisional Application U.S. Ser. No. 60/444,462, commonly assigned and incorporated herein by reference. Such cassettes can be of varying sizes. The medium is often referred to as a sheet or screen.

Once the radiology technologist exposes a body part to an x-ray which is storage as a latent image on the screen, the cassette is loaded into reader 10 at a receiving station or supply area 14. Cassette supply area 14 is shown in FIG. 1 as a load platform. Scanning can be initiated by various methods, for example, by loading the cassette in supply area 14 or by pressing a start button on display 12.

Inside reader 10, using means known to those skilled in the art, the screen is extracted from the cassette and moved along a path P in a direction A through a scan area 16 wherein the screen is scanned. Once a portion of the screen has been scanned, it is erased by being moved through an erase area 18 wherein it is erased by exposure to light which removes the remnants of the image, as will be more particularly described below.

Once the entire screen has been scanned and erased, the direction of the screen is reversed and the screen is returned to the cassette.

It is recognized that the screen can be erased in the return direction (i.e., when being returned to the cassette) rather than the forward direction (i.e., direction A).

A light cover 20 can be provided to shield the scan area from exposure to ambient or room light. Light cover 20 can also be employed to shield other elements of reader 10, such as the scan element and collector from exposure to ambient or room light.

Figure 2:
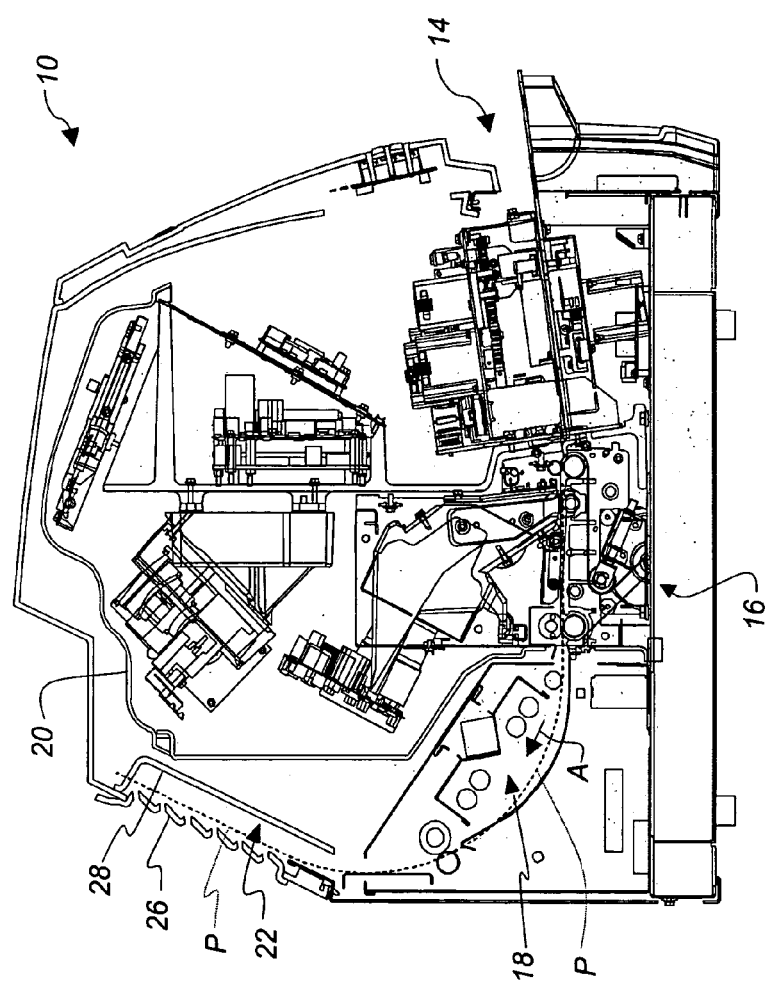
FIG. 2 shows a left side plan view of the storage phosphor reader of FIG. 1.

As best shown in FIG. 2, portions of the screen may extend beyond erase area 18, particularly if the screen is of a larger size. Accordingly, a portion of the screen may be disposed within an area herein referred to as an access area 22. Access area 22 is an area disposed proximate path P outside of erase area 18 and which is not shielded by light cover 20. If desired, a cover or other access member 26 can be configured to shield/cover access area 22. Cover 26 is configured to be removable from reader 10 so that the portion of the screen disposed within access area 22 can be accessed. An optional support member 28 can be provided to provide some support for the screen when disposed within access area 22.

Figure 4:
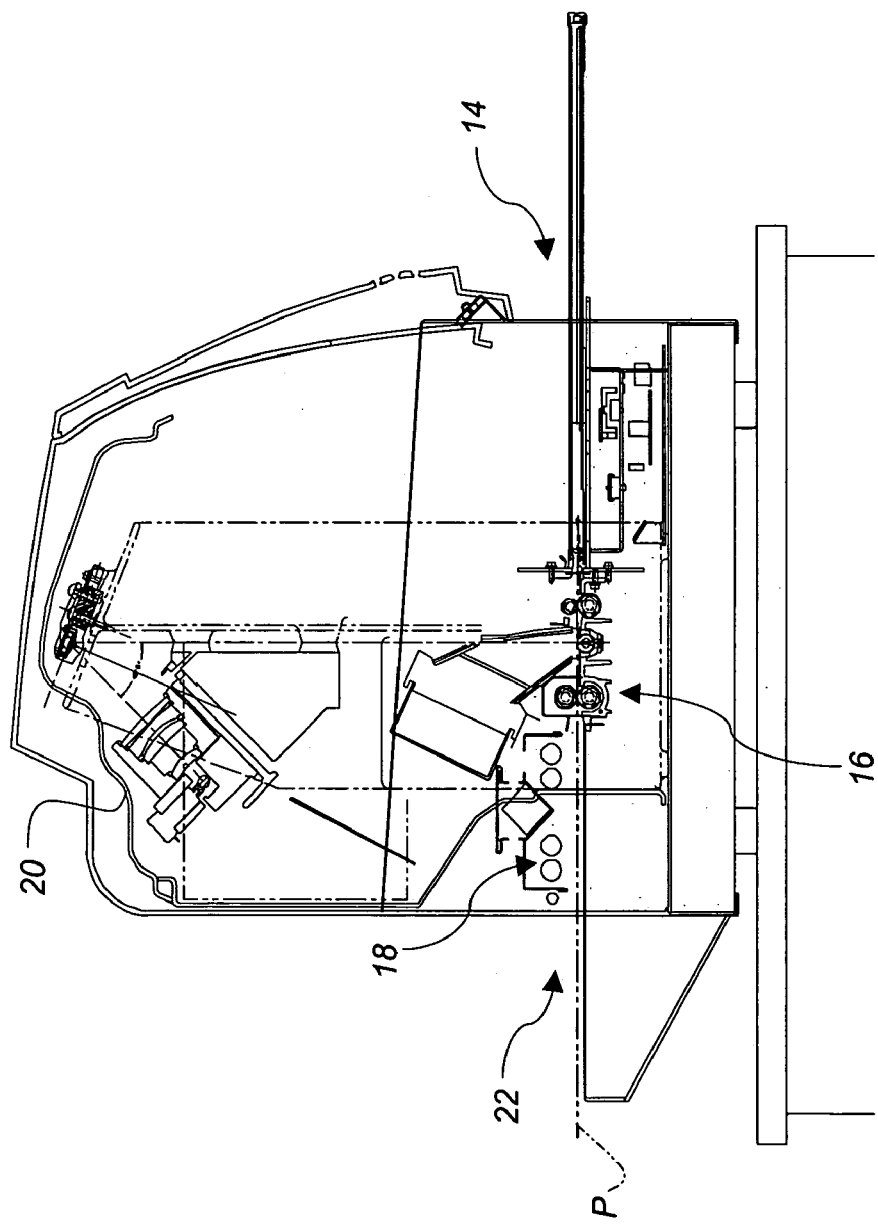
FIG. 4 shows a left side plan view of another embodiment of the storage phosphor reader of the present invention.

While the present invention is described with regard to a flexible or semi-flexible storage phosphor medium, it is recognized that storage phosphor can be disposed on a rigid or semi-rigid plate and mounted in an x-ray cassette. U.S. Pat. No. 5,943,390, commonly assigned and incorporated herein by reference, discloses such a cassette. Such plates and cassettes can be of varying sizes. A reader in accordance with the present invention can be configured to accept such a rigid or semi-rigid plate. Referring to FIG. 4, there is shown an embodiment wherein path P is substantially linear/planar.

Reader 10 can include a reverse path feed option to allow reader 10 to be used as an erase-only device, for example, when not used as a reader.

As indicated above, once a portion of the screen has been scanned, it is erased by being moved through an erase area 18 wherein it is erased by exposure to light which removes the remnants of the image. It is desirable to erase substantially all the latent image from the screen prior to returning the screen to the cassette.

The light exposure can be from a fluorescent lamp, mercury lamp, metal halide lamps, and the like.

Figure 3:
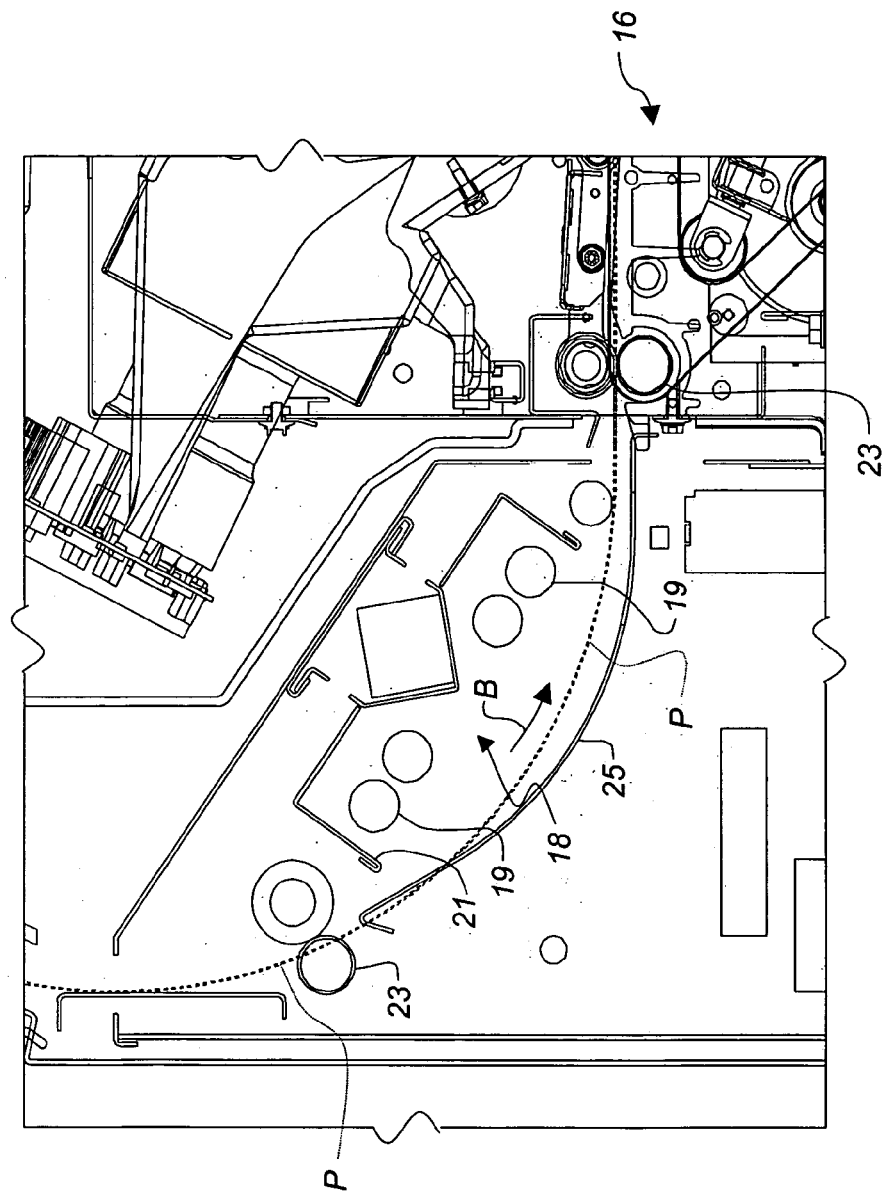
FIG. 3 shows the erase assembly of the storage phosphor reader of FIG. 2.

As best shown in FIGS. 2 and 3, erase area 18 includes at least one light source member 19. Light source members are well known and can include a lamp such as a fluorescent lamp, sodium lamps, metal halide lamps, and mercury lamps. As shown, a plurality of light source members are shown. In a preferred embodiment, light source member 19 is configured in a U-shape, so is shown in the cross-sectional view of FIGS. 2 and 3 as two circles. Light source member 19 is ON when the screen is in erase area 18.

A reflector 21 can be provided proximate light source member 19 to direct light emitted by member 19 toward path P.

Rollers can be employed to transport the screen into and out of erase area 18. FIGS. 2–3 show a plurality of roller pairs 23 providing transport of the screen along path P.

An optional guide member 25 disposed proximate path P in erase area 18 can be employed to promote transport of the screen through erase area 18.

Only a portion of the screen can be disposed within erase area 18 since erase area 18 is smaller than the screen. That is, erase area 18 cannot hold the entire screen. Consequently, only a portion of the screen can be erased at a particular period of time. Therefore, the screen is moved through erase area 18 in a manner so as to access all portions of the screen for erasure.

Referring now to FIGS. 2–3 and 5, a screen 30 is transported through reader 10, a leading edge 32 of screen 30 is first directed along path P in the direction shown by arrow A such that leading edge 32 is the first portion of screen 30 transported through scan area 16 and erase area 18. An edge opposite leading edge 32 is a trailing edge 34. Accordingly, trailing edge 34 is the last portion of screen 30 directed along path P through scan area 16 and erase area 18. The remaining two edges of screen 30 are herein referred to as side edges 36,38.

Scanning of the screen within scan area 16 is preferably accomplished when the screen is being transported at a constant speed. Since erase area 18 is proximate scan area 16, the screen is being transported through erase area 18 at the same speed as when transported through scan area 16.

When the direction of the screen is reversed (i.e., in the direction shown by arrow B in FIG. 3) to return the screen to the cassette, the screen is transported along path P such that trailing edge 34 is the first portion of the screen that exits erase area 18 and enters scan area 16.

An area of screen 30 disposed along the length of screen 30 adjacent trailing edge 34 is shown generally in FIG. 5 as trailing portion 35. This area of screen 30 is the last portion of the screen to enter erase area 18. Since the screen is transported through erase area 18 at the same speed as through scan area 16, Applicants have recognized that trailing portion 35 may not be effectively erased if the screen direction is reversed immediately upon completion of the scanning. To effect erasure of trailing portion 35, transport of the screen is stopped for a predetermined time (hereinafter, DWELL) before the direction of the screen is reversed (arrow B) to return the screen to the cassette.

In addition, the higher the exposure level of the storage phosphor, the longer the time period with which the screen is preferably exposed to light source member 19 to effect erasure. As such, it may be preferred to further illuminate light source member 19 as the screen is moved in direction B (to return the screen to the cassette) to provide additional erasure.

To determine if (and how much) additional erasure should be employed, the exposure level is reviewed. More particularly, when the latent image is transported through scan area 16 and processed/scanned, a plurality of exposure levels of the latent image are detected. The highest/largest exposure level detected during a particular scan is referred herein as CVmax, wherein exposure is expressed in code values, abbreviated as CV. Once the exposure level determined, reader 10 can effect a variable amount of erasure of the screen as the screen is transported in direction B as it is returned to the cassette. The amount of exposure is determined from the data scanned from the screen as it is processed in scan area 16.

Still further, as leading edge 32 enters erase area 18, a portion of the screen adjacent leading edge 32, herein referred to as leading portion 40, may not be sufficiently erased as so may benefit from additional erasure as the screen is transported in direction B as it is returned to the cassette. Leading portion 40 may not be sufficiently erased since optional guide member 25 might absorb (or not reflect) the light. Accordingly, it may be desired to vary the speed of the screen as it is moved in direction B so as to apply additional light to some areas (for example, leading portion 40).

Therefore, the method and apparatus of the present invention provides erasure of the screen such that (1) the screen is effected with a fixed amount of erasure as it is transported through reader 10, (2) the screen is provided with an additional, variable amount of erasure as it is transported out of the reader, wherein the amount of additional erasure is determined from the scan data, and (3) the speed of the screen is varied (so as to vary the amount of erasure) as the screen is transported out of the reader so that particular portions of the screen are provided with additional exposure sufficient to erase the latent image in the storage phosphor.

Applicants have noted an advantageous affect of the present invention over a constant-speed system is that, in the present invention, the overall time to erase is less since no empty/wasted time is given to screen areas that do not require additional light for erasure than is needed. As such, system throughput is not reduced.

In the present invention, erasure of the screen is varied for three areas of the screen, leading portion 40, trailing portion 34, and a central portion 42 intermediate leading portion 40 and trailing portion 34. More particularly, erasure time is increased for trailing portion 35 by causing trailing portion 35 to dwell/stop within erase area 18 for a predetermined time period of DWELL seconds. Afterwhich, the screen is moved in direction B at a first predetermined speed (for example, at one of two selectable speeds (fast or slow)) while central portion 40 is disposed within erase area 18. Thereafter, when leading portion 40 is disposed within erase area 18, at a second predetermined speed different from the first predetermined speed such that the speed of the screen is further varied.

In one embodiment, a look-up table (LUT) can be employed in determining the time/speed of erasure/transport of the screen. Such a LUT can be generated and stored in a storage memory disposed within reader 10 so as to be accessible during operation of reader 10. The LUT can be configured to provide specific erase information corresponding with a particular CVmax value (or range of CVmax values) and a particular screen size (since reader 10 is preferably configured to accepted a plurality of screen sizes, such as 18×24, 15×30, 24×30, 35×35, and 35×43). For example, the erase information can be stored in the LUT can be the DWELL time and the time/speed for the central portion 42 and leading portion 40 within erase area 18.

Then, in operation, screen 30 is transported through scan area 16 and then into erase area 18. The lamps of erase area 18 are emitting light to promote erasure of the latent image from the storage phosphor. Rather than immediately reverse the direction of the screen to return the screen to the cassette, once trailing edge 34 of screen 30 enters erase area 18, the motion of screen 30 is stopped so as to hold screen 30 in erase area 18 for a time (DWELL) period obtained from the LUT to promote erasure of the latent image on screen area 35. Once the dwell time has elapsed, the screen direction is reversed, and the screen is transported in direction B out of erase area 18 at a speed/velocity chosen/determined such that every point on central portion 42 takes a predetermined period of time to traverse the erase area, and subsequently, that every point on leading portion 40 takes a predetermined period of time to traverse the erase area.

Reader 10 includes control means known to those skilled in the art for effecting stopping of the transport of the phosphor sheet when the trailing edge of the phosphor sheet enters the erase area; dwelling of the phosphor sheet within the erase area for a predetermined time period; and transport of the phosphor sheet along the path in a second direction opposite the first direction after dwelling;

In another embodiment, rather than a LUT, the information stored in the LUT can be calculated. For example, information directed to the erase (e.g., time/speed and erase/transport) can be produced by calculations that employ the CV value(s) and generate the erase information. The calculation (or algorithm) could be based on a mathematical model of the characteristics of the screen and erase system, or could be derived by inspection and analysis of experimental results.

The present invention allows a reduction in a dwell time for low exposures (i.e., low values of CVmax), which increase the throughput of the screens. The present invention also allows the erasure of the trailing edge to be selectively determined, rather than set to a fixed value. Still further, the present invention allows for the additional exposure time of the leading edge.

Fluorescent light emits a greater amount of light when warm than when cold. Therefore, if light source member 19 is a fluorescent lamp, it is advantageous to keep the lamp warm. As such, when reader 10 has not been actuated for a predetermined time period, it may be desirable to cycle the lamp ON to keep the lamp warm. That is, keeping the lamp warm by cycling the lamp ON/OFF when reader 10 is idle. For example, a cycle time of 3.5 minutes OFF and 0.5 minutes ON might be employed for an idling duty cycle for the lamps. As such, the cycled ON time is substantially less than the OFF time, though sufficient to keep the lamp warm.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 10 | storage phosphor reader |
| 12 | touch screen display |
| 14 | cassette supply area |
| 16 | scan area |
| 18 | erase area |
| 19 | light source member |
| 20 | light cover |
| 21 | reflector |
| 22 | access area |
| 23 | rollers |
| 26 | cover |
| 28 | optional support member |

What is claimed is:

1. A method for erasing a radiation image in a storage phosphor sheet in which a radiation image was recorded and then read by collecting stimulated emission from the phosphor sheet, the method comprising the steps of:
    transporting the phosphor sheet along a path in a first direction at a first speed into an erase area having at least one erasing light source, the phosphor sheet having a leading edge and a trailing edge;
    exposing a portion of the phosphor sheet disposed within the erase area to the light source to affect erasure of the radiation image on the exposed portion of the phosphor sheet;
    stopping transport of the phosphor sheet when the trailing edge of the phosphor sheet enters the erase area;
    causing the phosphor sheet to dwell within the erase area for a predetermined time period;
    transporting the phosphor sheet along the path in a second direction opposite the first direction at a second speed different than the first speed; and
    transporting the phosphor sheet along the path in the second direction at a third speed different than the second speed when the leading edge exits the erase area.

2. The method of claim 1, wherein the second or third speeds are determined by determining a level of collected stimulated emission from the phosphor sheet during reading.

3. The method of claim 1, wherein the second or third speeds are stored in a look-up table.

4. The method of claim 1, wherein the second or third speeds are stored in a look-up table and correspond with a dimension of the phosphor sheet.

5. The method of claim 1, wherein the at least one erasing light source is in an ON condition during erasing and in an OFF condition during other times, and the at least one erasing light is cycled to an ON condition for a first time period after having been in an OFF condition for a predetermined time period, the first time period being less than the predetermined time period.

6. An apparatus for removing stored energy from a storage phosphor screen in which a radiation image was recorded and then read by collecting stimulated emission from the phosphor sheet, the phosphor sheet having a leading edge and a trailing edge, comprising:
    an erase area having at least one erasing light source;
    transport means for transporting the phosphor sheet along a path in a first direction at a first speed into the erase area to expose a portion of the phosphor sheet disposed within the erase area to the light source to affect erasure of the radiation image on the exposed portion of the phosphor sheet;
    control means for effecting (i) stopping of the transport of the phosphor sheet when the trailing edge of the phosphor sheet enters the erase area, (ii) dwelling of the phosphor sheet within the erase area for a predetermined time period and (iii) transport of the phosphor sheet along the path in a second direction opposite the first direction after dwelling;
    determining means for determining a second speed different than the first speed in which to transport the phosphor sheet along the path in the second direction; and
    determining means for determining a third speed different than the second speed in which to transport the phosphor sheet along the path in the second direction when the leading edge exits the erase area.

7. The apparatus of claim 6, further comprising means for determining a level of collected stimulated emission from the phosphor sheet during reading.

8. The apparatus of claim 6, further comprising a look-up table for storing the second and third speeds.

9. The apparatus of claim 6, wherein the determining means is a look-up table.

10. The apparatus of claim 6, wherein the determining means is a look-up table which corresponds with a dimension of the phosphor sheet.

11. The apparatus of claim 6, wherein the determining means is a calculation or algorithm.

12. The apparatus of claim 6, further comprising means for placing the at least one erasing light source is in an ON condition during erasing and in an OFF condition during other times, and means for cycling the at least one erasing light to an ON condition for a first time period after having been in an OFF condition for a predetermined time period, the first time period being less than the predetermined time period.

* * * * *